2,747,671
Patented May 29, 1956

2,747,671

TREATMENT OF OIL-BEARING FORMATIONS

Theodore J. Nowak, Whittier, and Paul W. Fischer, East Whittier, Calif., assignors to Union Oil Company of California, Los Angeles, Calif., a corporation of California No Drawing. Application October 5, 1951, Serial No. 250,026

7 Claims. (Cl. 166—33)

This invention relates generally to a method for the treatment and selective blocking of water-bearing sands which are located within or near an oil-producing formation. More particularly, this invention relates to a method for the selective plugging of water sands whereby the permeability of the sand to water flow is decreased to a greater extent than the permeability to oil flow.

Many processes have been devised for the plugging of oil-bearing formations in an attempt to plug and seal off the water-bearing strata while maintaining the oil-bearing strata open for the free flow of oil. In general, such processes have not proved altogether satisfactory owing to a general lack of selectivity. Thus, in the case of cementing, the liquid cement normally enters all formations indiscriminately and is equally effective in permanently plugging both the oil strata and the water strata.

The present invention is based upon the discovery that solutions comprising certain cellulose derivatives and certain alkyl silicates can be pumped into a bore hole and thence into the formation whence the permeability of the sand to water flow is selectively decreased relative to the permeability of the sand to oil flow. Furthermore, these plugging solutions are generally oil-dispersible and generally produce precipitates upon appreciable dilution with water. The precipitate forms a permanent plug with respect to the aqueous phase in the formation, but it may be dispersed in additional treating solution or mixtures of oil and treating solution.

It is therefore an object of this invention to plug preferentially the water-bearing strata of an oil-bearing formation.

It is another object of this invention to inject solutions comprising certain cellulose derivatives and certain alkyl silicates into an oil-bearing formation, which solutions tend to be oil-dispersible and tend to precipitate upon mixing with water.

It is another object of this invention to treat an oil-bearing sand with a solution comprising a cellulose derivative and an alkyl silicate in an organic solvent, remove the excess solution by fluid flow, and thereby decrease the permeability of the treated sand to water flow to a greater extent percentagewise than the corresponding permeability of the sand to oil flow.

Other objects and advantages of this invention will become apparent to those skilled in the art as the description thereof proceeds.

Briefly, this invention relates to a method for the selective reduction of the permeability of a sand to water flow relative to the reduction of corresponding permeability of the sand to oil flow. According to the invention, a solution of one or more of certain cellulose derivatives and one or more of certain alkyl silicates in an organic solvent is injected into the sand. After the solution is removed by any suitable means, such as by the natural flow of fluids therethrough into the well bore, the sand is rendered less permeable to water flow without substantial or deleterious impairment of the permeability to oil flow.

Cellulose derivatives which may be employed in the process of this invention include certain cellulose nitrates, cellulose ethers, and cellulose esters. The preferred cellulose derivative is a cellulose ether.

Cellulose has a complex organic structure consisting of a plurality of chemically combined d-glucose units, each unit having the empirical formula $C_6H_{10}O_5$. The following structure has been tentatively assigned to the cellulose molecule:

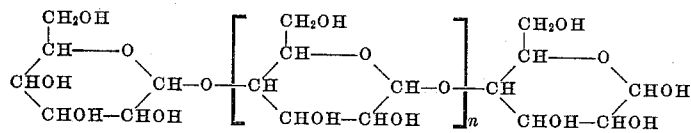

The three hydroxyl groups of each d-glucose unit may be converted into cellulose derivatives according to the conventional reactions of alcohols. It is customary to refer to the average conversion of the three hydroxyl groups in terms of "degree of substitution" wherein a value of 1 indicates that on the average only one of the three hydroxyl groups is substituted. The theoretical maximum degree of substitution is 3.

In the cellulose derivatives employed in this invention the —$CH_2OH$ or =$CHOH$ groups are reacted so that the —OH radical is replaced with a nitrate group as in —$ONO_2$, or with an ether linkage as in —OR or with an ester linkage as in —O—CO—R. In the foregoing formulae, R is generally an alkyl or alkenyl radical having not more than 4 carbon atoms. R is preferably an alkyl group, however. Thus, R may be a methyl, ethyl, propyl, butyl, isobutyl, vinyl, allyl, crotyl, or the like. The preferred cellulose ether for this invention is an ethyl cellulose.

The cellulose derivatives employed in this invention are soluble in organic solvents such as alcohols, ketones, esters, ethers, acids, aliphatic and aromatic hydrocarbons, or mixtures of such solvents and the like. Such cellulose derivatives are generally insoluble in water and are generally precipitated from the organic solvent upon the addition of water.

The preferred solvents for the cellulose derivatives include the lower molecular weight alcohols and ketones such as those having fewer than about 6 carbon atoms. In order to reduce the cost of such solvents they may be, and preferably are, mixed with less expensive liquid hydrocarbons so as to form solvent mixtures containing from about 0 to 75% of the hydrocarbon. Hydrocarbons which may be employed for this purpose include gasoline, kerosene, aromatic hydrocarbons and the like.

The solubility characteristics of the cellulose derivatives depend upon the degree of substitution which in turn varies according to the nature of the substitution. Where the cellulose derivative is a cellulose nitrate (nitrocellulose), the degree of substitution may vary between 2.1 and 2.8 and preferably between 2.3 and 2.6. Where the substituted group is an ether linkage, the degree of substitution depends on the particular functional group. Methyl celluloses which may be employed in this invention have a degree of substitution between about 2.6 and 2.9. Degrees of substitution for other cellulose ethers include the following: ethyl cellulose between about 2.0 and 2.9, propyl cellulose between about 1.5 and 2.9, and butyl or isobutyl celluloses between about 1.0 and 2.9. In the case of cellulose ethers other than methyl, it is generally preferable that the degree of substitution be in the range of between about 2.2 to 2.9.

Cellulose esters such as cellulose acetate, cellulose propionate, cellulose butyrate, and the like, are customarily prepared by substantially complete esterification of the cellulose followed by a subsequent partial hydrolysis. Increasing hydrolysis produces products with increasingly limited solubility in water and progressively increased solubility in organic solvents. For purposes of this invention the cellulose derivatives may either be prepared by esterification to a degree of substitution insufficient to produce water solubility while sufficient to produce solubility in organic solvents, such as in ethyl alcohol, acetone and the like, or such cellulose derivatives may be produced by a substantially complete esterification of the cellulose followed by a partial hydrolysis to a degree of substitution which minimizes the water solubility. Among the cellulose esters, the preferred composition is a cellulose acetate. The esters to be employed in this invention will generally have a degree of substitution between about 1.5 and 2.5.

The alkyl silicates which are employed in conjunction with the aforementioned cellulose derivatives are those having less than five carbon atoms in the alkyl group, i. e., methyl, ethyl, propyl and butyl silicates. Ethyl silicate is preferred. The presence of the silicate decreases the oil dispersibility of the cellulose derivative which is precipitated within the formation, but renders such precipitate highly permanent with respect to dislodgement by water flow.

The treating solutions of this invention are prepared by dissolving any of the aforementioned described cellulose derivatives and alkyl silicates in a suitable organic solvent. Suitable organic solvents include alcohols such as methy, ethyl, propyl, isopropyl, butyl, isobutyl, amyl, isoamyl and the like. Ketones which may be employed include acetone, methyl ethyl ketone, diethyl ketone, methyl isobutyl ketone and the like. Ethers which may be employed include diethyl ether, methyl propyl ether, and the like. Other organic solvents which may be employed include dioxane, pyridine, benzene, toluene, xylene, and hydrocarbon fractions such as gasoline, kerosene, gas oil, and the like.

In general, the organic solution will contain between about 0.5 and 10%, and preferably between about 1 and 5%, by weight of the cellulose derivative, and between about 0.5 and 10%, preferably between about 1 and 5%, by weight of the alkyl silicate.

In certain cases, additional components may be advantageously employed to vary the nature of the plugging composition and improve its adhesive and plugging character. Usually between about 0.1 to 5%, and preferably between about 0.4 and 3%, by weight of these other components is employed.

Natural and/or synthetic oil-soluble resins are examples of such additional components. A particularly suitable synthetic resin is the mixture of polymers obtained from the polymerization of beta-pinene. Other synthetic resins which may be employed include polymers of butadiene, pentadiene, methyl pentadiene, styrene, acrylic acid, acrylic acid esters, acrylonitrile, and the like, or mixtures thereof. Other materials which may be added include dihydroabietyl maleate.

In other cases rosin acid and rosin acid soaps may be incorporated in the treating solution as an additional component. Usually between about 0.1 and 5% by weight of the rosin acid and/or rosin acid soap is normally employed and preferably between about 0.4 and 2% by weight. The soaps are usually prepared in the form of an alkali metal soap of the rosin acid.

The term "rosin acid" is employed to denote both gum and wood rosins and also derivatives of such rosins such as are obtained by hydrogenation, dehydrogenation, disproportionation, decarboxylation, isomerization, polymerization, or combinations of such processes. Such methods of modifying gum and wood rosins are well known in the art. The rosin or modified rosin may also be fractionated as by solvent extraction to produce various acidic fractions which may be employed in this invention.

A particularly suitable rosin soap is obtained from those acids obtained by the disproportionation of ordinary rosin. The natural rosin is contacted with an active hydrogenation catalyst in the absence of added hydrogen at an elevated temperature until it contains at least about 40% of dehydroabietic acid and less than about 1% of abietic acid. Upon distillation, the disproportionated rosin may be separated into a plurality of cuts. The middle fraction, ranging from 50% to 90%, is the preferred acid for the preparation of rosin soaps for employment in this invention.

The middle cut of distilled dehydrogenated or disproportionated rosin is converted into an alkali metal salt by neutralization with an alkali metal compound, basic in nature. Among the alkali compounds suitable for this reaction are the hydroxides, carbonates, etc., of lithium, sodium, potassium, etc.

The treating solutions of this invention may be introduced into the formation by any of the established techniques for injecting fluids into strata surrounding bore holes. Since the solution precipitates upon mixing with water it is generally preferable, if not even necessary, to remove any water from the bore hole itself. One method consists of preceding the injection of the treating solution with the injection of an organic solvent having appreciable oil and water solubilities, e. g. methanol, ethanol, acetone and the like. Where it is desired to spot the solution into particular strata, the remaining strata may be blocked suitably by packers.

After the solution is introduced it is generally displaced subsequently by formation fluids and/or precipitated thereby. The fluid displacement and/or precipitation generally occurs as a natural consequence of putting the well on production.

The permeability of a sand or other porous media is determined by Darcy's Law:

$$K = \frac{QLM}{TA\Delta P} \times 10^3$$

wherein,

K is the permeability in millidarcies (md.)
Q is the fluid flow in cubic centimeters (cm.)
T is the time in seconds
L is the core thickness in centimeters (cm.)
A is the core area in square centimeters (sq. cm.)
M is the viscosity in centipoises
$\Delta P$ is the incremental pressure in atmospheres It is found that when one of the hereinabove described treating solutions is contacted with oil-bearing and water-bearing sands of substantially the same permeability such treatment selectively decreases the water permeability to a considerably greater extent than the oil permeability is decreased. This phenomenon is illustrated by the data set forth in the following example:

*Example I*

Pairs of cores having substantially the same permeabilities in the range near 800 md. were selected for testing. A simulated oil-bearing formation was prepared by treating one of the cores with water containing about 3% salt and thereafter passing oil through the core until the water content of the core was no longer reduced. The oil employed was a kerosene fraction boiling between about 350° F. and 525° F. A simulated water-producing formation was prepared by saturating the other core with water containing 3% salt.

The next step of each experiment consisted in determining the permeability of the oil-saturated core to oil flow and the permeability of the water-saturated core to water flow. In the third step, approximately 10 pore volumes of the treating solution was flowed through each core while the core was maintained at substantially 135° F. In the fourth step of the procedure the core containing the treating solution was allowed to set for about 24 hours at room temperature. In the fifth step the treated core was flushed with a backflow of approximately 250 pore volumes of fluid, water being employed to backflow the water-saturated core and kerosene being employed to backflow the oil-saturated core. During the backflow a pressure drop of approximately 110 p. s. i. per inch of core length was employed. The final step of the procedure consisted of redetermining the permeability of each treated core. The decrease of permeability of the oil-saturated core to oil flow and of the water-saturated core to water flow was then determined and compared to determine any selectivity. In certain instances additional backflow was employed to determine if additional improvement might result from additional flushing. In some cases it was found that the selectivity increased as the result of additional flushing. In no case did additional backflow decrease the selectivity of the treatment.

The compositions tested and the test results obtained thereon are reported in Table 1 as follows:

The foregoing disclosure of this invention is not to be considered as limiting since many variations may be made by those skilled in the art without departing from the spirit or scope of the following claims.

We claim:

1. The method of differentially shutting off water in an oil well penetrating both oil- and water-bearing formations which comprises forcing down the well and into said formation a plugging composition comprising an organic solvent having dissolved therein between about 0.5 and about 10 per cent by weight of a water-insoluble cellulose derivative selected from the class consisting of cellulose nitrate, cellulose ethers of alcohols containing less than five carbon atoms and cellulose esters of acids containing less than five carbon atoms, between about 0.1 and about 5 per cent by weight of an alkyl silicate, the alkyl group of which contains less than five carbon atoms and between about 0.1 and about 5 per cent by weight of an oil-soluble resin; allowing the formation fluids to act upon said composition, whereby said formations are rendered less permeable to water flow than to oil flow; and thereafter removing unchanged plugging composition from said well.

2. The process of claim 1 wherein the cellulose derivative is a cellulose ether.

3. The process of claim 1 wherein the cellulose derivative is ethyl cellulose.

Table 1

| Experiment No. | 1 | 2 | 3 | 4 | 5 | 6 |
|---|---|---|---|---|---|---|
| Composition, Percent by Wt.: | | | | | | |
| Ethyl Cellulose | | 11.0 | 2.8 | | 2.8 | 2.8 |
| Cellulose Acetate | 5.9 | | | | | |
| Acetone | 61.2 | | | | 27.6 | 28.5 |
| Isopropanol | 32.9 | 89.0 | 28.3 | 27.8 | | |
| Methanol | | | | | | |
| Kerosene | | | 66.1 | 64.5 | 64.5 | 66.3 |
| Beta-pinene Resin [b] | | | 2.8 | 2.7 | 2.8 | |
| Ethyl Silicate | | | | 5.0 | 2.3 | 2.4 |
| Permeability after Treatment, Percent of Original Permeability: | | | | | | |
| Oil-bearing Core (X) | 38 | 44 | 64 | 101 | 65 | [a] 41 |
| Water-bearing Core (Y) | 3 | 0.6 | 20 | 68 | 7 | [a] 8 |
| Ratio, X/Y | 12.7/1 | 73.4/1 | 3.2/1 | 1.5/1 | 9.3/1 | 5.1 |

[a] Original permeability=<300 md.
[b] Melting point=207° F.

Examination of these data show that compositions which consist only of a cellulose derivative and a single or mixed solvent (Experiments Nos. 1 and 2), while they are highly selective in that they reduce the permeability of the water-bearing core to a much greater extent than they reduce the permeability of the oil-bearing core, they nevertheless reduce the permeability of the oil-bearing core by considerably greater than 50%. Experiment 3 shows that the addition of a resin to the cellulose derivative solution effects some improvement insofar as overall reduction in the permeability of the oil-bearing core is concerned, but greatly reduces the selectivity of the composition. Experiment 4 shows that an alkyl silicate in the absence of a cellulose derivative is without substantial effect on the permeability of the oil-bearing core, but has very low selectivity. Experiment 5, however, shows that a combination of a cellulose derivative and an alkyl silicate in accordance with the present invention has good selectivity but at the same time does not cause too great a reduction in the permeability of the oil-bearing core. In Experiment 6, the relatively large reduction in the permeability of the oil-bearing core can be attributed to the fact that the core employed was very dense, having an original permeability of less than 300 md.

4. The process of claim 1 wherein the alkyl silicate is ethyl silicate.

5. The process of claim 1 wherein the organic solvent is a mixture comprising at least 25 per cent by volume of a liquid selected from the class consisting of alcohols and ketones containing less than six carbon atoms, the remainder being a hydrocarbon oil.

6. The process of claim 1 wherein the cellulose derivative is ethyl cellulose having a degree of substitution between about 2.0 and about 2.9, and the alkyl silicate is ethyl silicate.

7. The process of claim 1 wherein the oil-soluble resin is polymerized beta-pinene.

References Cited in the file of this patent

UNITED STATES PATENTS

| | | |
|---|---|---|
| 2,034,347 | Loomis et al. | Mar. 17, 1936 |
| 2,265,962 | Bent et al. | Dec. 9, 1941 |
| 2,338,799 | Buckley et al. | Jan. 11, 1944 |
| 2,366,036 | Leverett et al. | Dec. 26, 1944 |
| 2,375,753 | Clare | May 15, 1945 |
| 2,379,974 | Little | July 10, 1945 |
| 2,404,033 | Burrell | July 16, 1945 |
| 2,544,247 | Asaff | Mar. 6, 1951 |